United States Patent [19]

Heshmat

[11] Patent Number: 4,674,894

[45] Date of Patent: Jun. 23, 1987

[54] BEARING LUBRICATION DEVICE

[75] Inventor: Hooshang Heshmat, Latham, N.Y.

[73] Assignee: Reliance Electric Company, Greenville, S.C.

[21] Appl. No.: 740,236

[22] Filed: May 31, 1985

Related U.S. Application Data

[63] Continuation-in-part of Ser. No. 569,526, Jan. 9, 1984, Pat. No. 4,531,845.

[51] Int. Cl.⁴ .............................................. F16C 33/10
[52] U.S. Cl. ..................................... 384/406; 384/403
[58] Field of Search .............. 384/403, 404, 405, 406, 384/167; 308/83, 84, 85 R, 85 A, 85 B, 86; 184/15.1, 11.5

[56] References Cited

U.S. PATENT DOCUMENTS

| 905,631 | 12/1908 | Bascome et al. | |
| 1,265,991 | 5/1918 | Bergstrom | 384/406 |
| 1,466,731 | 9/1923 | Schmidt | 384/405 |
| 1,621,751 | 3/1927 | Pruger | 384/406 |
| 1,653,377 | 12/1927 | Smith et al. | |
| 2,090,465 | 8/1937 | Baudry et al. | 384/406 |
| 3,499,503 | 3/1970 | Murray et al. | 384/405 X |

FOREIGN PATENT DOCUMENTS

| 234781 | 7/1960 | Australia | 384/420 |
| 71831 | 12/1915 | Austria | 384/405 |
| 289836 | 1/1916 | Fed. Rep. of Germany | 384/406 |
| 558786 | 9/1932 | Fed. Rep. of Germany | |
| 2142249 | 6/1974 | Fed. Rep. of Germany | |

OTHER PUBLICATIONS

Clower, "Lubricants and Lubrication," First Ed., 2nd Impression 1939, pp. 204–209.
Ozdas et al., "Oil Transfer and Cooling in Ring-Oiled Bearings," Engineering, 180 (1955).

Primary Examiner—Stuart S. Levy
Assistant Examiner—Thomas R. Hannon
Attorney, Agent, or Firm—Dority & Manning

[57] ABSTRACT

A bearing lubrication device for use in ring-oiled journal bearings and the like in which a generally circular ring member is eccentrically disposed around the rotatable shaft in the bearing assembly. The ring has an outer surface, right and left sides extending downwardly from the outer surface at a predetermined angle, most preferably about 30 degrees, for a predetermined distance and then radially inwardly, generally perpendicular to the outer surface for a predetermined distance, and an inner surface, said inner surface having at least one, but preferably a plurality of grooves therein. As rotation occurs at high forward speeds, improved lubricant delivery, stability of operation and bearing performance capability are realized.

19 Claims, 10 Drawing Figures

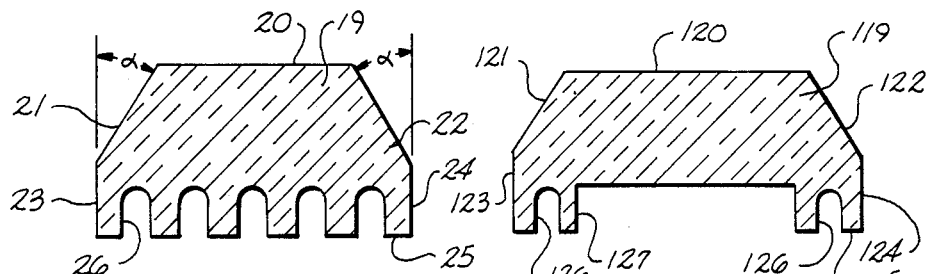
Fig. 3   Fig. 4
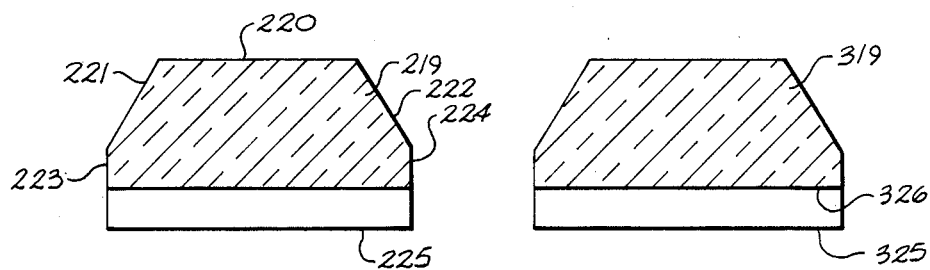
Fig. 5   Fig. 6
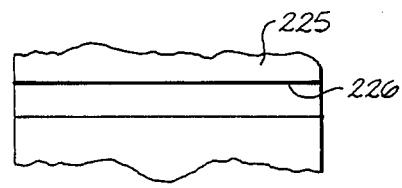 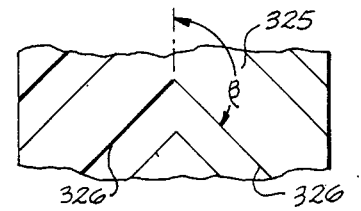
Fig. 5a   Fig. 6a

BEARING LUBRICATION DEVICE

CROSS REFERENCE TO RELATED APPLICATION

This is a continuation-in-part of application Ser. No. 06/569,526, filed Jan. 9, 1984, now U.S. Pat. No. 4,531,845.

BACKGROUND OF THE INVENTION

Oil rings are extensively used as conduit means for carrying oil or other lubricant from a reservoir to moving members, such as journal bearings, shafts, and the like. In operation, the oil ring is normally loosely disposed around the shaft and rotates as the shaft rotates, through contact with the shaft. Lubricant is carried from a sump or reservoir to the shaft, in the contours or grooves of the oil ring and by frictional attraction as the ring moves through the reservoir. The lubricant is deposited on the shaft or other member through the gravitational, frictional, and centrifugal forces inherent in the operation. Under conditions of slow rotation, the gravitational and frictional forces generally deliver a sufficient supply of lubricant; however, at higher velocities, which can be as high as 3000 to 4000 ft./min., the oil ring is either moving too fast for gravity to effect dispersion of the oil, or the centrifugal force on the ring and the oil is too great to overcome, and the oil either remains on the ring or is thrown outside of the rotational field. Thus, the lubricant does not reach the desired area, resulting in early wear and possible failure of the shaft, bearing, oil ring, or other associated members.

Rotation of the oil ring depends on a propulsive force developed between the rotating shaft and the ring. As speeds increase, a fluid film is developed, and the driving force is transmitted to the ring by this lubricant film. The situation is analogous in many ways to that in a floating ring bearing and, without a direct drive mechanism, a slippage occurs. Prior attempts to develop a higher frictional coefficient and, thus, a more positive drive mechanism, have focused on modification of the cross-sectional geometry of the ring, including both inside and outside surfaces of the ring. Such prior ring structures have included T-shaped rings where the cross of the T serves as the inside surface, rings having a generally trapezoidal cross-section where the inner ring surface is planar, and rings having a generally trapezoidal cross-section where the inner ring surface contains a single wide groove thereacross.

Factors opposing rotation of the ring are the drag on the lower portion of the ring which is submerged in the lubricant reservoir, the force required to lift the lubricant from the reservoir toward the top of the journal, and the frictional drag on the ring applied by close-running stationary surfaces, such as the sides of the ring slot in the bearing. Other factors affecting lubricant delivery include the composition of the ring and the viscosity of the lubricant used in the bearing. In addition, since a conventional oil ring rests on the upper surface of the shaft during operation and during periods of non-use, much wear results from the contact alone. When at rest, most of the lubricant drains back into the reservoir and very little lubricant protection is available for the start-up operation. Thus, until the lubricant film is re-established, early wear of the shaft, ring, bearings, and other associated members is likely to occur. This, in turn, leads to repair and replacement expenses, and the concomitant loss of operating time.

SUMMARY OF THE INVENTION

It is, therefore, one of the principal objects of the present invention to enhance the lubricating ability of oil rings, thereby increasing the capability and the capacity of thrust and journal bearings, by providing a bearing lubrication device having an oil ring configured to afford a greater oil delivery to the shaft and bearings, even at high rotational speeds.

A still further object of the present invention is to provide an oil ring which is usable with most or all devices currently employing conventional oil rings, and which is economical to produce and to use.

Yet another object of the present invention is to provide an improved oil ring that is stable at high operating speeds with superior oil delivery.

These and other objects are attained by the present invention which generally relates to a bearing lubrication device for use in ring-oiled bearings and the like, which has a rotatable shaft, a bearing surface, a lubricant reservoir, and a generally circular ring member eccentrically rotatably received about said shaft for carrying lubricant from the reservoir for deposition on the shaft and the bearing surface. The ring member, preferably metal rotates with the shaft, and is constructed for stable operation at high rotational speeds with superior lubricant delivery than was possible with the conventional oil rings.

More specifically, the improved oil rings according to the present invention comprise an outer surface, right and left sides that angle from said outer surface at a predetermined angle, for a predetermined distance and then angle radially inwardly, generally perpendicular to said outer surface, and an inner surface that has at least one, though preferably a plurality of grooves therein.

Preferred oil rings according to the present invention, have a particular size and weight with a plurality of grooves being provided in the inside ring surface. Optimum unit weight for present oil rings from a standpoint of oil delivery and ring stability ranges from about 0.131 to about 0.142 pounds per inch of circumferential length. Relative inner diameter of the ring to outer diameter of the journal should be from about 1.5 to about 2.0, and preferably about 1.7. Further, the right and left angled side walls preferably define an angle from the upper surface in a range of from approximately 25 degrees to approximately 35 degrees and most preferably approximately 30 degrees. Moreover, the perpendicular side wall portions preferably should have at least a predetermined length.

Various other objects and advantages of the present invention will become apparent from the below description, with reference to the accompanying drawings.

BRIEF DESCRIPTION OF THE DRAWINGS

FIG. 3 is an enlarged cross-sectional view of a preferred oil ring embodiment according to the present invention;

FIGS. 4, 5 and 6 are enlarged cross-sectional views of further preferred oil ring embodiments according to the present invention;

FIGS. 6a and 5a are partial plan views of the grooved inner surfaces of oil rings as illustrated in FIGS. 6 and 5, respectively;

DETAILED DESCRIPTION OF THE PREFERRED EMBODIMENT

Figure 1:
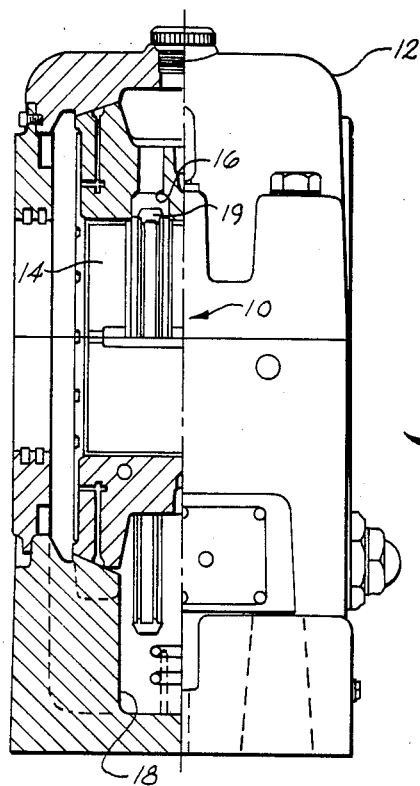
FIG. 1 is a side elevational view, shown partially in cross-section, of a pillow block-type journal bearing assembly with an oil ring according to the present invention disposed around the shaft of the bearing assembly.
Figure 2:
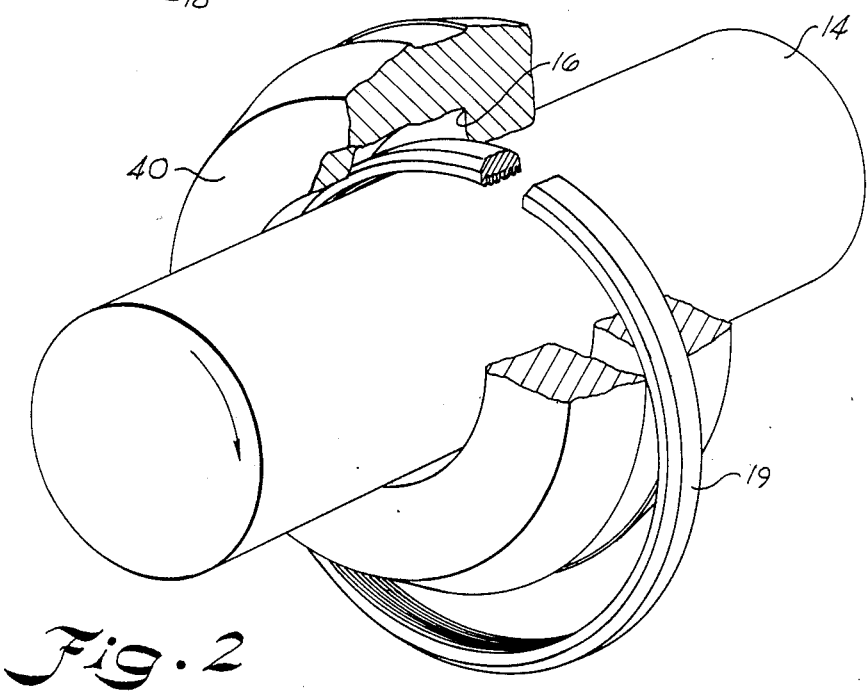
FIG. 2 is a partial perspective view of the bearing lubrication device embodying the present invention, shown here installed in a pillow block-type bearing, with a portion of the bearing structure broken away, revealing the cross-section and orientation of the oil ring with respect to the shaft.

Referring now more specifically to the drawings, and to FIGS. 1 and 2 in particular, numeral 10 designates generally the bearing lubrication device embodying the present invention. The device is shown here disposed in a journal bearing 12, although its application is not limited in any way thereto. The assembly can normally be used wherever conventional oil rings are used for lubrication purposes, and in a variety of different devices. In normal operations with bearings of the type shown, an oil ring 19 is loosely, eccentrically disposed around a rotatable shaft 14, and rotates therewith in a manner to be explained below. Oil ring 19 rotates in a ring slot 16 located in a bearing member or liner 40, through a lubricant reservoir 18 and, as rotation occurs, carries lubricant from reservoir 18 upwardly for deposition on the shaft and the bearing surfaces.

A most preferred oil ring embodiment according to the present invention is illustrated in FIGS. 2 and 3. As thus illustrated, ring 19 has an outer surface 20, right and left side portions 21, 22, that taper outwardly from outer surface 20 an angle $\alpha$, and right and left vertical side portions 23, 24, that are of a predetermined length and are generally perpendicular to outer surface 20. Ring 19 further has an inner surface 25 that defines a plurality of circumferentially extending side-by-side grooves 26 therein.

A second oil ring embodiment 119 according to the present invention is illustrated in FIG. 4. Ring 119 has an outer surface 120, right and left side portions 121, 122 at an angle $\alpha$ as shown in FIG. 3, generally vertical side portions 123, 124 and an inner surface 125. Inner surface 125 of ring 119 is shown to have a plurality of circumferential grooves therein, including a central groove 127 with outer, narrower grooves 126 along opposite sides of same.

FIGS. 5 and 5a illustrate yet another embodiment of the oil ring of the present invention. Ring 219 has an outer surface 220, side portions 221, 222 at a predetermined angle $\alpha$, perpendicular side portions 223, 224 and an inner surface 225. Inner surface 225 has a plurality of grooves 226 therein and located therearound which, as shown in FIG. 5a, are transverse to the circumference of ring 219.

FIGS. 6 and 6a likewise illustrate an oil ring 319 having generally transverse grooves 326 around an inner surface 325. Grooves 326 are, however, V-shaped with the legs of the V being at an angle $\beta$ of approximately 135 degrees.

With oil rings of the present invention, the relative angle $\alpha$ of angular sides 21, 22 in conjunction with the length of vertical sides 23, 24 have the greatest impact on oil delivery, particularly, as angle $\alpha$ of sides 21, 22 approaches zero degrees (0°), side drag of ring 19 in ring slot 16 approaches maximum. Such causes the ring to operate erratically due to the greater side drag, and oil delivery is reduced due to insufficient ring speed. Conversely, as angle $\alpha$ of sides 21, 22 is increased, consequently shortening the length of vertical sides 23, 24, oil delivery increases accordingly and the lubricant is thrown off the ring by the rotational forces in the form of a splash or spray. Through experimentation, angle $\alpha$ for angular sides 21, 22 has been determined to preferably range from about 25 degrees to about 35 degrees and most preferably is approximately 30 degrees, regardless of the diameter of the ring or the depth of the inside grooves 26.

Through experimentation it has also been determined that the length of vertical sides 23, 24 relative to angle $\alpha$ may be controlled for improved oil delivery dependant upon journal speed ranges. Shorter vertical side dimensions are preferred for low journal speeds, while longer vertical sides are preferred for the higher journal speed ranges. Also it has been determined that vertical side lengths less than one millimeter produced wear and unstable operation at low journal speeds.

Figure 8:
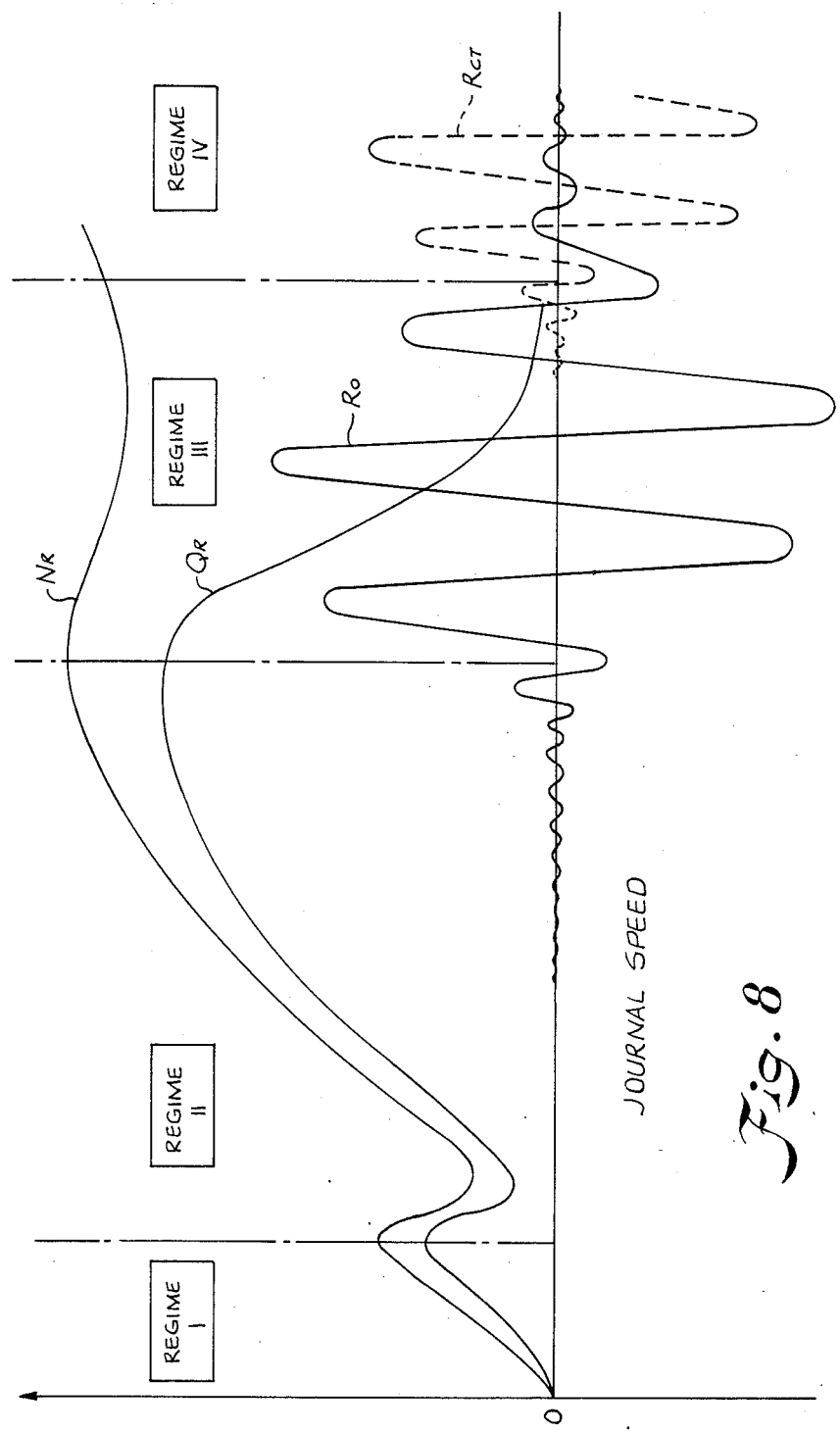
FIG. 8 is a general graphical representation of oil ring behavior as a function of journal speed.

FIG. 8 generally represents a curve of oil ring behavior over a range of journal speeds and depicts relative oil delivery by the ring through four regimes, I, II, III and IV. Curve $N_R$ represents ring rotational frequency, $Q_R$ oil delivery, and $R_O$, ring oscillation. In regime I, at low journal speeds, oil ring 19 follows the journal at approximately the same peripheral speed. As the speed of shaft 14 increases, a transition point is reached at the end of regime I where, a hydrodynamic lubricant film begins to form. Ring speed at this transition point is considered to be the primary speed of the ring with respect to the journal speed. Primary speed of the oil ring is a combined function of the ring weight, shape, projected areas of contact, journal speed, lubricant viscosity, and localized temperature.

As journal speed increases into regime II, thus increasing the speed of the ring above the primary speed, formation of the hydrodynamic lubricant film causes ring slippage accompanied by a corresponding decrease in oil delivery. Upon establishment of a full hydrodynamic film between the journal and ring, further increase in journal speed is followed by increased ring speed and oil delivery to a maximum oil delivery for the ring. Maximum oil delivery occurs at the end of regime II where the actual rotating speed of the ring is a balance between the propulsive force at the region of contact between the ring and the journal and the resistive force of the lubricant drag on the ring, and is designated as the secondary speed. The secondary speed is also a function of many parameters, including journal speed, oil viscosity, ring submersion level, and ring shape. For example, the greater the length of vertical sides 23, 24 the lower the secondary speed.

Moving into regime III, a significant decrease in ring speed and oil delivery are observed. Coincidentally in regime III, it is noted that significant ring oscillation (curve $R_O$) is present. Ring oscillation in the plane of ring rotation actually begins to appear during the trailing portion of regime II, and though ring speed drops only slightly, oil delivery drops drastically in regime III, asymptotically approaching zero. Ring speed in regime III is referred to as tertiary speed and is believed to be the first rigid-body, critical speed of the ring.

In regime IV oscillating vibrations abate while conical vibrations (angular with respect to the shaft) and translatory vibrations (lateral with respect to shaft) begin, (curve $R_{CT}$) with frequency of both being that of ring rotational frequency or speed. Throughout regime IV, oil delivery remains essentially zero, resulting from oil splash and throw-off from the surface of the ring and partly also from the journal or shaft. Hence, above the tertiary speed regardless of journal speed, the rotational speed of the ring either remains constant or falls. Several specific factors influence this tertiary speed, including the ring shape, the ring-bore configuration which strongly controls the hydrodynamic stiffness of the ring, the weight or mass of the ring, and the ring diameter; for example, a larger ring has a lower tertiary speed. The effects of changes in lubricant viscosity on ring speed and lubricant delivery were also studied using lubricants of SAE 10, 20 and 30 weight, and it was found that though viscosity affected the primary and secondary speeds of the ring, tertiary speed was found to be independent of viscosity.

Various materials may be used in the fabrication of oil rings according to the present invention, including brass, Muntz (60% Cu, 40% Zn), and bronze (SAE-660). Tests conducted on these materials using lubricant SAE 10 at 120° F. and a ring submersion level at 15% of the ring diameter, indicated that bronze attained an oil delivery approximately 10% higher than the others tested. Tests of the wear properties, consisting of 30,000 start-stop cycles and 7,200 hours of continuous running at 1800 rpm, with lubricant SAE 10, indicated less wear with the brass ring, but differences were slight.

Referring back to FIG. 2, oil ring 19 is shown disposed eccentrically around shaft 14 with contact made at the top of shaft 14. Shaft 14 is rotatable in bearing member or liner 40, which may be of any suitable type and, in the embodiment shown, rotation is in the direction of the arrow. Ring 19 assumes approximately the position shown in FIG. 2 when the apparatus is at rest, thereby allowing the outer edges of ring 19 to contact shaft 14. As rotation of the shaft and ring occurs, lubricant is carried upwardly from reservoir 18 by inside grooves 26 where it is deposited on shaft 14.

Figure 7:
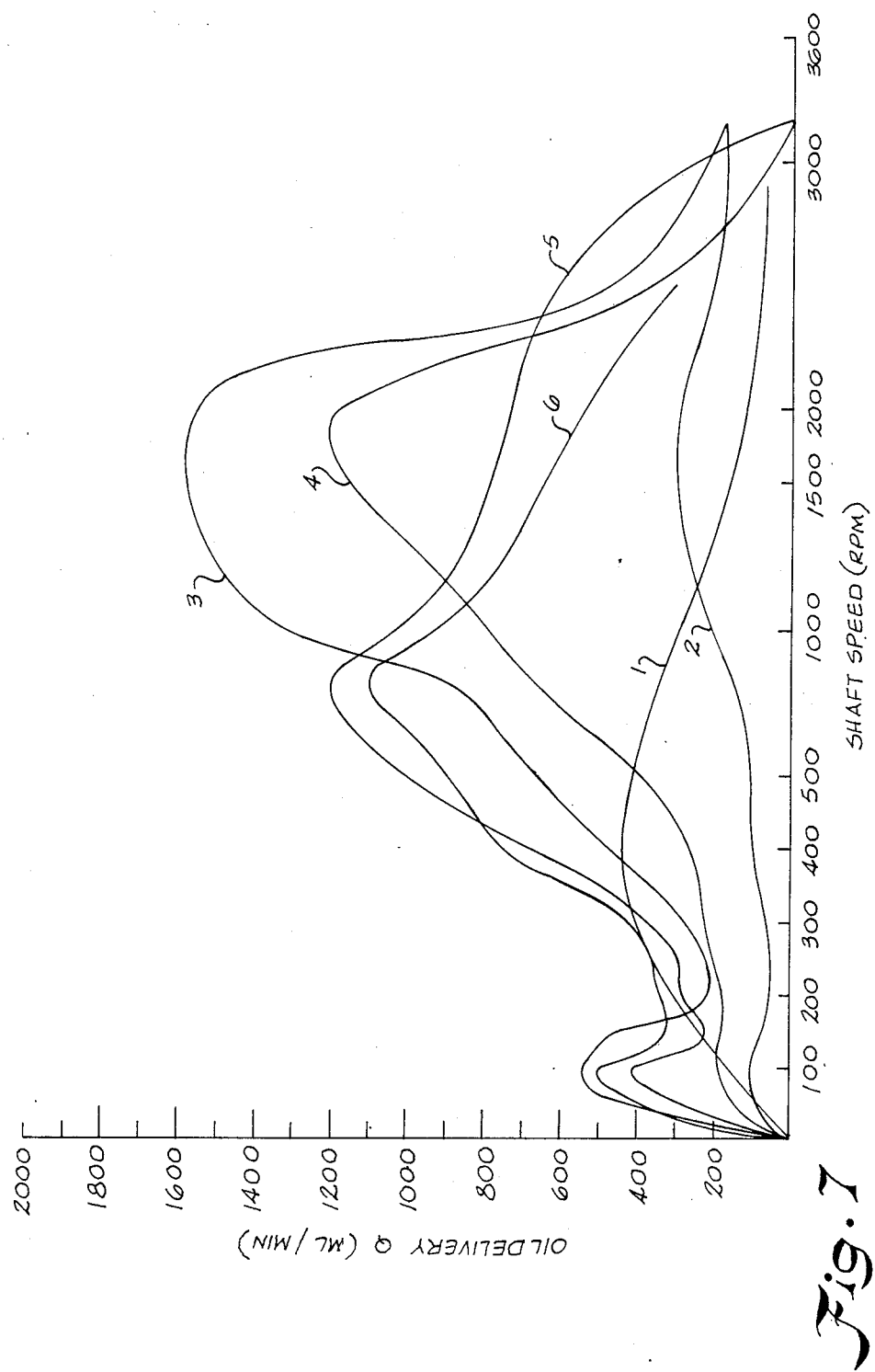
FIG. 7 is a graph of the relationship of shaft speed and oil delivery for the oil rings depicted in FIGS. 3 through 6 compared to prior art oil rings.

In copending application Ser. No. 06/569,526, the oil ring of FIGS. 1 and 4 is described in conjunction with a cantilevered leaf scraper, along with certain information demonstrating improved oil delivery over the use of such an oil ring per se. While such is true, the improved oil rings of the present invention achieve improved results without a stabilizer over prior oil rings. Such results are graphically demonstrated in FIG. 7. Particularly, in FIG. 7, graph 1 represents a commercial oil ring having a trapezoidal cross-section with a single wide groove along an inner surface of same, referred to as a Wulfel ring. Graph 2 represents a commercial oil ring having a T cross-section where the cross of the T provides an inner ring surface. Graphs 3, 4, 5 and 6 are representative of the oil rings of the present invention as illustrated in FIGS. 3, 4, 5 and 5a, and 6 and 6a, respectively. As can be seen, all of the instant oil rings performed significantly better than the prior art rings across the shaft speed range shown. Further, rings of the present invention not only exhibit superior lubricant delivery, but also, maintained stable operation beyond 2000 rpm.

The effects of varying the depth of groove on lubricant delivery for various shaft speeds was determined as set forth in copending application Ser. No. 06/569,526 and is incorporated herein by reference. Three rings of the embodiment shown in FIG. 4 were tested and were identical, except for the variance in inside groove depth where groove depth was 1.05 mm, 1.52 mm, and 3.20 mm. From this data, an optimum depth of approximately 1.52 mm was selected, providing approximately twice the oil delivery of rings having shallower or deeper grooves. The effects of variance in lubricant viscosity were determined based on experiments conducted with lubricants having SAE ratings of 10, 20, and 30 weight. Results indicated that the heavier lubricants showed marked increases in oil delivery, an important and desirable factor, especially in large bearing applications where the use of heavier lubricants and higher speeds are common.

It will be understood, of course, that while the form of the invention herein shown and described constitutes a preferred embodiment of the invention, it is not intended to illustrate all possible forms of the invention. It will also be understood that the words used are words of description rather than of limitation and that various changes may be made without departing from the spirit and scope of the invention herein disclosed.

What is claimed is:

1. A bearing lubrication device for use in ring-oiled journal bearings and the like, having a rotatable shaft and a bearing surface, comprising a generally circular ring member for serving as a lubricant conduit disposed eccentrically around said shaft for rotation therewith, said ring member comprising an outer surface, right and left side portions extending downwardly from said outer surface at a predetermined angle for a predetermined distance and then further downwardly generally perpendicular to said outer surface, and an inner surface for contacting said shaft over at least a portion of said inner surface, said inner surface having at least one groove therein.

2. A bearing lubrication device as defined in claim 1 wherein said ring member has a generally flat outer surface and said right and left sides angle away from said outer surface at an angle in a range of from about 25 degrees to about 35 degrees.

3. A bearing lubrication device as defined in claim 2 wherein said angle is approximately 30 degrees.

4. A bearing lubrication device as defined in claim 1 wherein a plurality of grooves are provided in said inner surface of said ring and extend circumferentially therearound.

5. A bearing lubrication device as defined in claim 4 wherein said grooves around said inner surface of said ring comprise a plurality of generally like configured side-by-side grooves across substantially the width of said ring.

6. A bearing lubrication device as defined in claim 4 wherein said grooves comprise a center groove and at least one outer groove on each side of said center groove, said center groove being wider than said outer grooves.

7. A bearing lubrication device as defined in claim 1 wherein a plurality of grooves are provided in said inner surface of said ring and extend generally transverse to the circumference of the ring and across the width of same.

8. A bearing lubrication device as defined in claim 7 wherein said grooves are generally perpendicular to the circumference.

9. A bearing lubrication device as defined in claim 7 wherein said grooves are V-shaped.

10. A bearing lubrication device for use in ring-oiled journal bearings and the like, having a rotatable shaft and a bearing surface, comprising a generally circular metal ring member for serving as a lubricant conduit disposed eccentrically around said shaft for rotation therewith, said ring member having a generally flat outer surface, right and left sides angling away from said outer surface at a predetermined angle for a predetermined distance and then angling radially inwardly, generally perpendicular to said outer surface for a predetermined distance and an inner surface, said inner surface having a plurality of grooves therein said grooves having a maximum depth of approximately 1.52 millimeters.

11. A bearing lubrication device as defined in claim 10 wherein said sides extend downwardly from said outer surface at an angle in a range of from about 25 degrees to about 35 degrees.

12. A bearing lubrication device as defined in claim 11 wherein said right and left sides angle away from said outer surface of said ring at an angle of approximately thirty degrees.

13. A lubrication device as defined in claim 10 wherein said grooves in said inner surface of said ring extend circumferentially therearound.

14. A lubrication device as defined in claim 10 wherein said grooves in said inner surface of said ring extend generally transverse to the circumference of said ring across the width of same.

15. An oil ring for delivery of oil from a reservoir to a shaft, said ring being generally circular in shape and comprising a generally flat outer surface, right and left sides extending downwardly from said outer surface at a predetermined angle for a predetermined distance and then angling radially inwardly, generally perpendicular to said outer surface for a predetermined distance, and an inner surface for contacting said shaft over at least a portion of said inner surface, said inner surface having at least one groove therein.

16. An oil ring defined in claim 15 wherein said sides extend downwardly at angle in a range of from about 25 degrees about 35 degrees.

17. An oil ring as defined in claim 15 wherein said angle is approximately 30 degrees.

18. An oil ring as defined in claim 15 wherein a plurality of grooves are provided in said inner surface and extend circumferentially around said inner surface.

19. An oil ring as defined in claim 15 wherein a plurality of grooves are provided in said inner surface and extend generally transversely to the circumference of the ring across the width of same.

* * * * *